May 9, 1950 J. A. HARDERSEN 2,507,007
LAWN EDGER
Filed Sept. 13, 1948
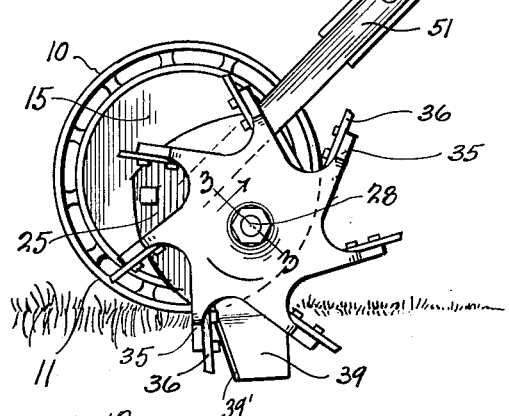
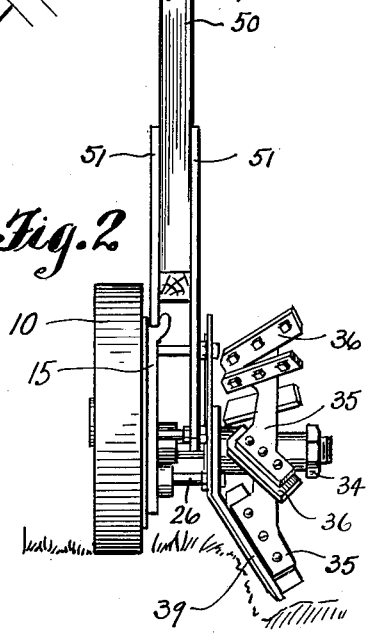
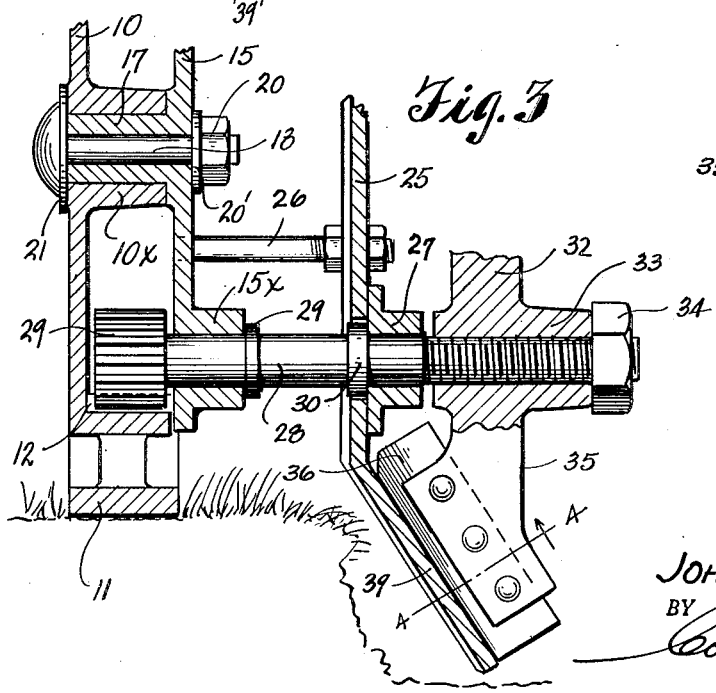
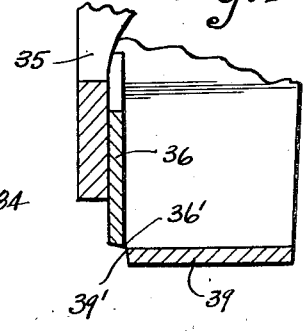
INVENTOR.
JOHN A. HARDERSEN
BY Cook & Robinson
ATTORNEYS Patented May 9, 1950

2,507,007

UNITED STATES PATENT OFFICE 2,507,007

LAWN EDGER

John A. Hardersen, Seattle, Wash.

Application September 13, 1948, Serial No. 49,032

1 Claim. (Cl. 56—256)

This invention relates to hand powered lawn edgers, and it has reference more particularly to a device of a single wheeled, lawn mower type whereby the overhanging grass along the edge of a raised lawn, for example as around a flower bed, or the like, may be trimmed off.

It is the principal object of this invention to provide a lawn edger of the above stated character whereby the working of clipping the overhanging grass along the edge of a raised lawn can be quickly, easily and satisfactorily accomplished to leave a neat and finished appearance. Furthermore, to provide a machine that may be pushed along the lawn near the edge, after the fashion of pushing a lawn mower, and which will operate to trim off the grass that may overhang the edge at an angle closely approaching a vertical cut.

It is also an object to provide a grass clipping reel of novel form and means for adjusting it to obtain the desired cutting action and to compensate for wear on the cutting blades.

Still further objects of the invention reside in the details of construction of the various parts of the device, and in their combination and mode of operation as will hereinafter be fully described.

In accomplishing the above mentioned and other objects of the invention, I have provided the improved details of construction, the preferred forms of which are illustrated in the accompanying drawings, wherein:

Fig. 1 is a side view of a lawn edger embodied by the present invention; a part of the handle being broken away to shorten the length of the view.

Fig. 2 is a front elevation of the same.

Fig. 3 is a sectional detail taken substantially on the line 3—3 in Fig. 1.

Fig. 4 is an enlarged section on line 4—4 in Fig. 3.

Referring more in detail to the drawings:

In its present preferred form of construction, the device comprises a ground wheel 10 of the type generally used on lawn mowers, having a tread or traction portion 11, and an integrally formed, internally toothed ring gear 12 concentric of the wheel; this construction being in accordance with the usual form of lawn mower wheel, thus to provide a driving wheel and gear for the actuation of the cutter blade carrying reel which forms a novel part of this invention.

Applied to the inside of the wheel 10, concentrically thereof and to the full diameter of gear 12, is a disk, or cover plate 15. This is formed centrally with an outwardly extending stub axle 17 as seen in Fig. 3, about which a cylindrical hub portion 10x of wheel 10 is fitted to revolubly mount the wheel. A bolt 18 is applied axially through the stub axle 17 and plate 15 and is secured by a nut 20 threaded onto its inner end against a washer 20. Applied about the outer end of the bolt and retained by its head portion, is a washer 21 that engages flatly against the outer end of the stub axle 17 and hub portion of the wheel to retain the latter in place.

Spaced inwardly from the plate 15 and parallel therewith is a blade carrier plate 25. This is rigidly secured to the disk 15 by a plurality of bolts 26 that have inner end portions fixed in the disk 15 and outer ends fixed in the plate. The plate 25 has a bearing 27 fixed thereto or formed as a part thereof, in which a shaft 28 is revolubly contained. The inner end portion of this shaft 28 extends through and is revolubly contained in a bearing 15x formed as an integral part of disk 15, and at its inner end the shaft mounts a gear wheel 29 thereon that operates in mesh with the internal gear teeth 12 of the ground wheel 10 for driving the shaft 28. In this connection it will be mentioned that gear 29 may be of the usual one-way clutch type for driving of the grass-cutting wheel only when the device is being pushed forwardly. Furthermore, it is to be pointed out that shaft 28 is held against any endwise shifting by means of collars 29 and 30 formed thereon to seat against the outer end of the bearing 15x and against the inside of plate 25 as has been illustrated in Fig. 3.

At its outer end the shaft 28 mounts the grass-cutting reel. This comprises a circular body 32 having a hub portion 33 that is adjustably threaded onto the outer end portion of driven shaft 28, and held by a lock nut 34. The reel body has a plurality of outwardly directed arms 35 at its periphery, equally spaced and somewhat tangentially inclined, rearwardly of the direction of rotation, as will be understood by reference to Fig. 1. Fixed to each of the several arms 35 is a grass-clipping blade 36. All blades have cutting edges, as at 36' in Fig. 4, arranged to coact with a stationary blade 38 that is either mounted by or formed as a part of the plate 25.

It is shown in Fig. 3 that the plate 25 is vertically disposed and at its lower edge is formed with a downwardly directed and outwardly inclined flange 39. This flange extends at an angle of about 35 degrees relative to the vertical plane of plate 25 and in position of use of the device, it extends somewhat below the normal ground level on which the wheel 10 rests in use as indicated in Fig. 2. The forward edge of the flange 39 is sharpened as at 39' in Fig. 4, to coact with the cutting edges of the blades 36 as they are brought into shearing contact therewith incident to rotation of the reel.

The cutting edge of the flange 39 is inclined rearwardly at such an angle that in the functional operation of the device, the blades 36 will first engage at their inner ends with the blade 39 near its upper end, and will then progressively advance therealong with shearing effect as will be understood by reference to the lowermost blade in Fig. 1.

To compensate for wear, and also to obtain a desired adjustment between the blades 36 of the reel and the blade 39, the reel may be turned on the threaded part of shaft 18, and then definitely locked at the desired position of adjustment by tightening the nut 34 against the outer end of its hub portion.

A handle 50 is fixed to the plates 15 and 25 through the mediacy of straps 51—51 in the usual manner as shown best in Fig. 2. This handle is used for the manual propulsion of the device in the same manner as a lawn mower is pushed.

With the device so constructed and with the understanding that it is operated after the fashion of the usual lawn mower and that the blade carrying reel is revolved in the direction indicated by the arcuate arrow thereon in Fig. 1 as the mower is advanced, it will be understood that rotation of the reel will cause the blades 36 to successively engage in shearing contact with the blade 39. The disposition of the blade 39 relative to the edge of a raised lawn is as noted in Figs. 2 and 3, which show the near vertical angle of the shearing edges of the blades and illustrate also the fact that the grass along the edge of a raised lawn may be cut off at the same angle.

Devices of this character are easy to use and effective in their particular use, leaving the lawn edge trim and attractive.

It is to be understood that details of frame construction and mode of attachment of parts may be changed to suit conditions or mechanical design without departing from the spirit of the invention and therefore it is not desired that the claims which terminate this specification be limited to any particular details of frame structure but that they be given an interpretation that is commensurate with the scope of the invention claimed, particularly in respect to relationship of reel to the ground wheel, the angle of the cut made by the blades and the provision for adjustment of the reel.

Having thus described my invention, what I claim as new therein and desire to secure by Letters Patent is:

A lawn edger of lawn mower type comprising a vertically disposed plate with a handle attached thereto, a hub extending from the plate, a ground wheel including a cutter driving gear wheel coaxial thereof, rotatably mounted on the hub, a blade mounting plate rigidly fixed to said vertically disposed plate, parallel thereto and inset from the said wheel, a blade rigidly fixed to the said blade mounting plate and extending downwardly and laterally at a sharp angle to below the surface on which the wheel will be supported in use, bearings formed in axial alignment in said parallel plates, a shaft rotatably mounted in said bearings and held against longitudinal movement therein, a driving gear fixed on the shaft, at one end, in operative mesh with the said cutter driving gear wheel, a reel mounted on the other end of the said shaft and blades fixed to said reel at spaced intervals thereabout to functionally coact with the first mentioned blade as the reel rotates; said reel being threaded on the shaft for adjustment of its blades relative to the first mentioned blade, and a lock nut threaded onto said shaft to engage the hub portion of the reel to lock it in adjustment.

JOHN A. HARDERSEN.

REFERENCES CITED

The following references are of record in the file of this patent:

UNITED STATES PATENTS

| Number | Name | Date |
|---|---|---|
| 897,436 | Watkins | Sept. 1, 1908 |
| 1,831,681 | Miller | Nov. 10, 1931 |
| 2,039,029 | Pond | Apr. 28, 1936 |
| 2,318,334 | Rowan | May 4, 1943 |

FOREIGN PATENTS

| Number | Country | Date |
|---|---|---|
| 384,497 | Great Britain | Dec. 8, 1932 |